US007707141B1

(12) United States Patent
Outhred et al.

(10) Patent No.: US 7,707,141 B1
(45) Date of Patent: Apr. 27, 2010

(54) USE OF A SET BASED APPROACH TO CONSTRUCTING COMPLEX QUERIES FOR MANAGING RESOURCES BUILT FROM A SET OF SIMPLE UNDERLYING OPERATIONS

(75) Inventors: Geoffrey Outhred, Seattle, WA (US); Yan-David Erlich, Seattle, WA (US); William G. Burton, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 953 days.

(21) Appl. No.: 10/306,533

(22) Filed: Nov. 27, 2002

(51) Int. Cl.
*G06F 17/30* (2006.01)
(52) U.S. Cl. .......................... 707/3; 709/204; 709/223; 709/226
(58) Field of Classification Search .................. 707/3–5
See application file for complete search history.

(56) References Cited

U.S. PATENT DOCUMENTS

| | | | | |
|---|---|---|---|---|
| 5,553,240 | A | | 9/1996 | Madduri |
| 6,112,304 | A | * | 8/2000 | Clawson ..................... 713/156 |
| 6,584,493 | B1 | * | 6/2003 | Butler ......................... 709/204 |
| 6,771,661 | B1 | * | 8/2004 | Chawla et al. .............. 370/468 |
| 6,799,208 | B1 | * | 9/2004 | Sankaranarayan et al. .. 709/223 |
| 6,901,446 | B2 | * | 5/2005 | Chellis et al. ............... 709/226 |
| 2002/0152305 | A1 | * | 10/2002 | Jackson et al. .............. 709/224 |
| 2002/0169765 | A1 | * | 11/2002 | Saltz ............................. 707/3 |
| 2003/0182425 | A1 | * | 9/2003 | Kurakake .................... 709/226 |
| 2004/0010488 | A1 | * | 1/2004 | Chaudhuri et al. ............. 707/3 |
| 2004/0068486 | A1 | * | 4/2004 | Chidlovskii .................... 707/3 |
| 2004/0199530 | A1 | * | 10/2004 | Avadhanam et al. ........ 707/100 |
| 2004/0267719 | A1 | * | 12/2004 | Doherty et al. ................ 707/3 |
| 2006/0041505 | A1 | * | 2/2006 | Enyart ......................... 705/40 |

OTHER PUBLICATIONS

Ravi Ramamoorthi, et al.; "A General Resource Reservation Framework for Scientific Computing", Dec. 1997.
Rodion M. Podorozhny, et al.; "Modeling Resources for Activity Coordination ans Scheduling", Dec. 1998.

* cited by examiner

*Primary Examiner*—Don Wong
*Assistant Examiner*—Sheree N Brown
(74) *Attorney, Agent, or Firm*—Shook, Hardy & Bacon L.L.P.

(57) ABSTRACT

The present invention relates to a system and methodology for resource query management. The system includes a resource manager, a query engine and a filter component. The system facilitates construction and management of a resource query across resource type(s) that may be similar, different, incongruent and/or distinct. Accordingly, an SQL environment is leveraged to perform efficient, complex and intensive queries and/or operations using resource query constraint(s) from a resource constraint(s) store and the filter component over large set(s) of resources from the resource pool.

18 Claims, 8 Drawing Sheets

USE OF A SET BASED APPROACH TO CONSTRUCTING COMPLEX QUERIES FOR MANAGING RESOURCES BUILT FROM A SET OF SIMPLE UNDERLYING OPERATIONS

TECHNICAL FIELD

The present invention relates generally to query management, and more particularly to a system and method for constructing and managing database queries over a disparate resource pool.

BACKGROUND OF THE INVENTION

Computer and network technology have transformed many important aspects of everyday life. Computers are becoming more of a household staple rather than a luxury, an educational tool and an entertainment medium. Computers allow users to manage and forecast finances, to control household electrical and mechanical operations like heating, cooling, lighting and security, and to store permanent records and images, for example. Network technologies such as the Internet have provided users with virtually unlimited access to remote systems and information, and associated applications. This type of access in many cases has become a complex maze of processes that is often off-loaded to third-party systems to manage. With technology advancements in wireless communication, a user can access the Internet from a palm size portable computer from just about anywhere in the world.

Consumers are becoming very dependent on communicating through the Internet. For example, many consumers prefer on-line shopping to the traditional method of physically going to a store or mail order shopping because on-line shopping is more quick and convenient as compared to conventional shopping schemes, and is now considered reliable and relatively secure. In addition, most on-line stores accept and validate major credit cards after completing an order and further provide confirmation information. Tracking numbers that allow the consumer to follow their purchase from the on-line store to their house are sometimes provided.

Another example is email. Many computer users prefer email over traditional communication methods of telephone conversations or letters via the post office. Email allows users to communicate across the world almost instantaneously. In addition, email is less expensive and more expeditious than traditional methods.

Retailers and wholesalers are aware of this trend—many are starting up web sites and providing on-line services for food and clothing purchases, information searches, email, stock trading and interactive games, for example. Numerous web sites require that a consumer or user create an account. Creation of an account can include providing a user name, password, personal information and/or registration of a payment mechanism (e.g., credit card, debit card, checking number). Creating, modifying and/or deleting an account are "provisioning transaction(s)". A resource provisioning system can automate resource provisioning transaction(s). For example, a resource provisioning system can create account(s), augment existing account(s), provide security limitation(s), and/or terminate account(s). As standards evolve, resource provisioning systems can facilitate changes in security and access. Additionally, resource provisioning systems can be designed to manage financial interactions between parties.

Many resource provisioning systems include a rules engine and workflow system; a logging and audit system; a resource database to store information and support the workflow and/or auditing tasks; and agents that communicate with applications to add, delete, suspend or change users and/or privileges. Not all provisioning systems have similar spans of control, however. Most enable database and application access, but vendors often need to increase their support for provisioning devices, access to buildings and service subscriptions, as well as automation of ordering of equipment and other supplies.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to a system and methodology for resource query management. In accordance with an aspect of the present invention, a query management system having a resource manager, a query engine and a filter component is provided.

The system facilitates construction and management of a resource query across resource type(s) that may be similar, different, incongruent and/or distinct. In accordance with an aspect of the invention, an SQL environment is leveraged to perform efficient, complex and intensive queries and/or operations using resource query constraint(s) from a resource constraint(s) store and the filter component over large set(s) of resources from the resource pool. The resource pool can include a plurality of distributed similar and/or disparate resource type(s). One advantage of the SQL environment is that queries can be performed over set(s) of resource(s), for example the resource pool, to determine resource(s) that meet the constraint(s) rather than query each resource individually.

The resource manager receives a resource query, for example, from a user of the system. The resource manager provides the resource query to the query engine. Additionally, the resource manager can be employed to facilitate operation(s) on the resource(s) defined in a filtered candidate set.

The query engine receives the resource query from the resource manager. Based, at least in part, upon the resource query and information stored in the resource constraint(s) store, the query engine identifies constraint(s) associated with the resource query. Thereafter, based, at least in part, upon the identified constraint(s), the query engine searches the resource pool to identify a candidate set of resource(s). The search can further be based, at least in part, upon attributes of the resource pool. The candidate set thus meets the constraint(s) and can potentially fulfill the resource query request.

The filter component can filter the candidate set, for example, to organize and/or limit the candidate set. The filter component can employ selection algorithm(s) to reduce the quantity of resource(s) in the candidate set. In one example, the filter component organizes the candidate set without removing any resource(s) of the candidate set. In another example, the filter component removes resource(s) from the candidate set (e.g., based on a ranking score associated with the resource(s)). In yet a third example, the filter component ranks the candidate set (e.g., based on a ranking schema)

and/or removes resource(s) from the candidate set with a ranking score below a predetermined threshold (e.g., static and/or dynamic).

For example, the filter component can employ a selection algorithm that identifies resource(s) based, at least in part, upon specifying properties, characteristic(s), attribute(s) and/or relationship(s) between resource(s). Based upon the selection algorithm, resource(s) of the candidate set can be removed, thus reducing the size of the candidate set.

The filter component can further rank resource(s) of the candidate set. The ranking can, for example, sort the resource(s) in order of operation(s) that will be performed on the resource(s). The resource manager can then be employed to facilitate operation(s) on the resource(s) defined in the filtered candidate set.

In accordance with another aspect of the present invention, the filter component comprises a selection component and/or a rank component. The selection component extracts a subset of the candidate set (e.g., reduced set) based, at least in part, upon properties, characteristic(s), attribute(s) and/or relationship(s) between resource(s) and stores the extracted subset in the candidate set. The selection component can thus reduce the size of the candidate set.

The rank component ranks the candidate set (e.g., based on a ranking schema) and/or removes resource(s) from the candidate set with a ranking score below a predetermined threshold (e.g., static and/or dynamic). The rank component can sort and/or order the candidate set based, at least in part, upon a predefined criteria (e.g., the order actions will be performed). Ranking allows, for example, the candidate set of resource(s) that can fulfill the request to be aligned in the specific order that the actions are going to be performed.

Yet another aspect of the present invention provides for a resource manager comprising an update component and/or a query component. The update component can facilitate changes to data in an underlying data store (not shown) and/or return data to a user and/or system. The update component can facilitate action(s) that will be performed on the resource(s) identified in the candidate set. The action(s) can include, for example, allocating and de-allocating resources or returning information regarding the candidate set. The resource manager can then provide a user with the results of the request.

The query component provides information regarding the filtered candidate set, for example, to a user and/or system. For example, the query component can return descriptions for substantially all the resource(s) in the candidate set.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

DETAILED DESCRIPTION OF THE INVENTION

Figure 1:
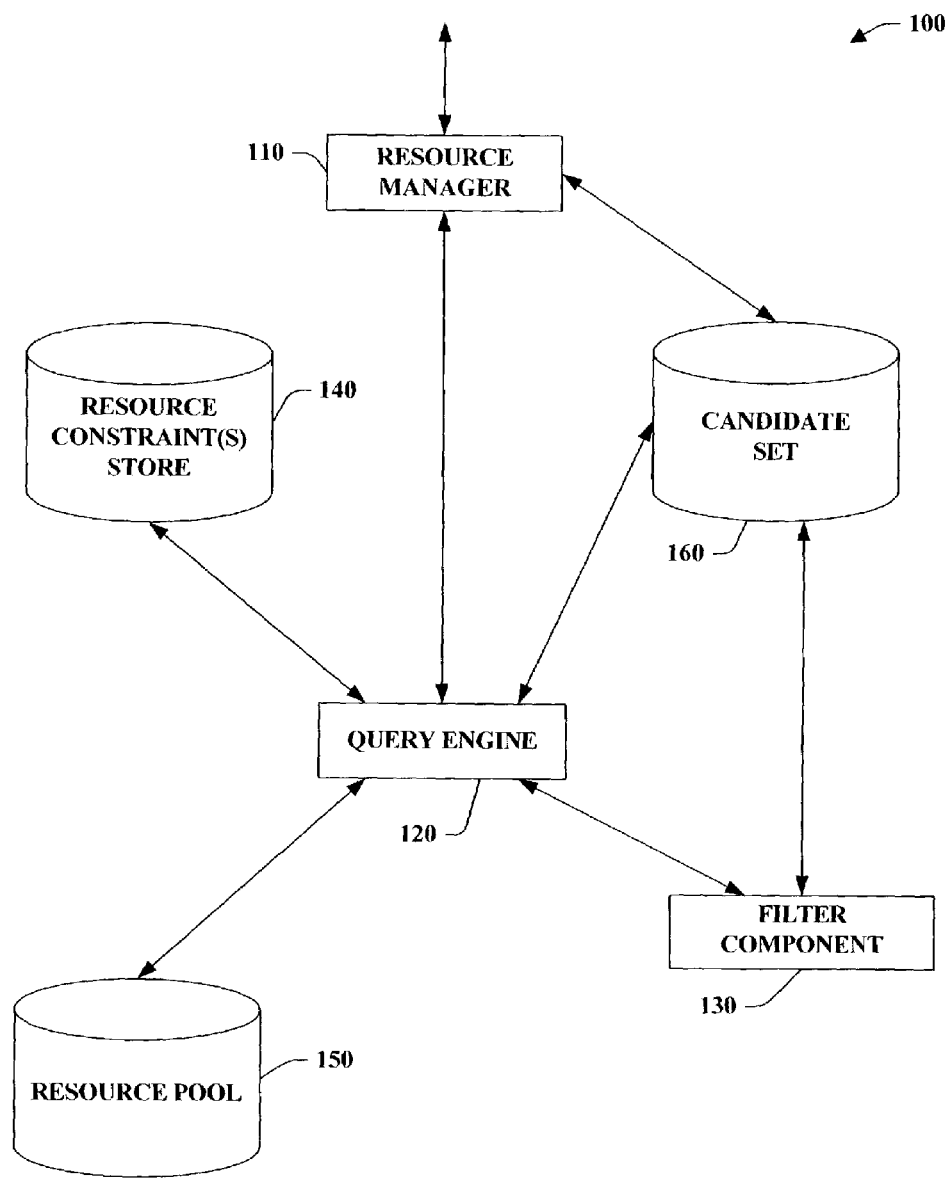
FIG. 1 is a block diagram of a query management system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Further "resource" refers generally to a consumable entity in a managed system. For example, a resource can be disk storage, network bandwidth and/or software license(s). "Provisioning transaction" refers to a transaction that alters availability of a resource.

Initially referring to FIG. 1, a query management system 100 in accordance with an aspect of the present invention is illustrated. The system 100 includes a resource manager 110, a query engine 120 and a filter component 130. Optionally, the system 100 can further include a resource constraint(s) store 140 and/or a resource pool 150.

The system 100 facilitates construction and management of a resource query across resource type(s) that may be similar, different, incongruent and/or distinct. In accordance with an aspect of the invention, an SQL environment is leveraged to perform efficient, complex and intensive queries and/or operations using resource query constraint(s) from the resource constraint(s) store 140 and the filter component 130 over large set(s) of resources from the resource pool 150. The resource pool 150 can include a plurality of distributed similar and/or disparate resource type(s), and is shown in the figure as one box for brevity of explanation. One advantage of the SQL environment is that queries can be performed over set(s) of resource(s), for example the resource pool 150, to determine resource(s) that meet the constraint(s) rather than query each resource individually.

In one example, a resource query involves moving consumers from a set of servers to another set of servers. Conventionally, this resource query involves searching each server to locate the consumers and then moving the consumers to the other servers. This entails searching each server with the same list of consumers that are requested to move regardless of whether they are on the server.

By employing the system 100, using SQL, for example, this same resource query can be accomplished in a significantly more efficient manner by first mapping the consumers to the server(s) on which they reside. Thereafter, a targeted search can be performed on the servers with the consumers, and the search of each server providing the list of consumers that reside on the server. One advantage is that the search can be performed faster and achieve identical or better results. It can be appreciated that the larger the resource pool is and/or the greater the number of requested resource type(s), the more efficient the system 100 (e.g., utilizing the exploitation of SQL) can become. Further, the system 100 is significantly easier for end user(s) (e.g., non-programmers) to build a resource query using specific resource type constraint(s) and selection algorithm(s) to personalize the query without having to write an application specific SQL program. Thus, the end user does not have to be proficient in SQL schema design and/or optimization, and can query a broad range of disparate resource(s) easily and effectively by employing the system 100.

The resource manager 110 receives a resource query, for example, from a user of the system 100. The resource manager 100 provides the resource query to the query engine 120. Additionally, the resource manager 110 can be employed to facilitate operation(s) on the resource(s) defined in a filtered candidate set 160.

The query engine 120 receives the resource query from the resource manager 110. Based, at least in part, upon the resource query and information stored in the resource constraint(s) store 140, the query engine 120 identifies constraint(s) associated with the resource query. Thereafter, based, at least in part, upon the identified constraint(s), the query engine 120 searches the resource pool 150 to identify a candidate set 160 of resource(s). The search can further be based, at least in part, upon attributes of resources of the resource pool 150. The candidate set 160 thus meet the constraint(s) and can potentially fulfill the resource query request.

The filter component 130 can filter the candidate set 160, for example, to organize and/or limit the candidate set 160. The filter component 130 can employ selection algorithm(s) to reduce the quantity of resource(s) in the candidate set 160. In one example, the filter component 130 organizes the candidate set 160 without removing any resource(s) of the candidate set 160. In another example, the filter component 130 removes resource(s) from the candidate set 160 (e.g., based on a ranking score associated with the resource(s)). In yet a third example, the filter component 130 ranks the candidate set 160 (e.g., based on a ranking schema) and/or removes resource(s) from the candidate set 160 with a ranking score below a predetermined threshold (e.g., static and/or dynamic).

For example, the filter component 130 can employ a selection algorithm that identifies resource(s) based, at least in part, upon specifying properties, characteristic(s), attribute(s) and/or relationship(s) between resource(s). Based upon the selection algorithm, resource(s) of the candidate set 160 can be removed, thus reducing the size of the candidate set 160.

The filter component 130 can further rank resource(s) of the candidate set 160. The ranking can, for example, sort the resource(s) in order of operation(s) that will be performed on the resource(s). The resource manager 110 can then be employed to facilitate operation(s) on the resource(s) defined in the filtered candidate set 160.

The resource query can involve, for example, an action to move information from one resource to another resource in the resource pool 150. The system 100 can be employed to ascertain a candidate set 160 of appropriate resource(s) (e.g., based on physical location, size and/or other constraint(s)) which can be further filtered by the filter component 130. The resource manager 100 can provide information associated with the filtered candidate set 160 in response to the resource query (e.g., to a user (not shown) and/or requesting system (not shown)).

Thus, in one example, the resource manager 110 receives a resource query (e.g., from a user (not shown)). The resource manager 110 provides information associated with the resource query to the query engine 120 which identifies constraint(s) based, at least in part, upon information stored in the resource constraint(s) store 140. The query engine 120 searches the resource pool 150 associated with a plurality of resources based, at least in part, upon the constraint(s) associated with the resource query and identifies a candidate set 160 of resource(s). For example, if the resource query were to allocate resource(s) for a new user account, the constraints could include servers that are online, are available for allocation, are part of the user's service plan and have the capacity for a new account.

Thereafter, the filter component 130 can filter the candidate set 160 to reduce the quantity of resource(s) of the candidate set 160. After being reduced, the filter component 130 can rank and/or sort the candidate set 160. The resource manager 110 can then respond to the resource query by providing information associated with the filtered candidate set 160 (e.g., to the user). The resource manager 110 can further be employed to facilitate operation(s) (e.g., update and/or query) on the resource(s) defined in the filtered candidate set 160.

For example, the resource query provided to the resource manager 110 can relate to moving a particular set of users, for example mail users, from the server they are on to another server. The query engine 120 can query the resource pool 150 for mail user resources based on constraint(s) from the resource constraint(s) store 140. For example, the constraint(s) can be users on exchange servers. Once the query is completed, the candidate set 160 includes users on exchange servers. Users that are not part of an exchange server will not be included in the candidate set 160.

Thereafter, the candidate set 160 can then be refined by the filter component 130. The filter component 130 can, for example, remove user(s) with accounts less than a specific size (e.g., ten Megabytes). The filter component 130 can then rank the resource(s) of the candidate set 160. The ranking can be based, for example, on accounts in ascending order based on the size of the accounts. The resource manager 110 can then facilitate action(s) associated with moving the exchange user accounts from one server to another.

In another example, the resource query provided to the resource manager 110 can involve moving a particular set of users (e.g., email users) from the server they are on to another set of servers. The constraints can include information regarding the desired users and the desired servers. For example, the constraints can be users on exchange servers, and, systems with exchange servers. The query engine 120 can query the resource pool 150 for the resource(s) that include the constraints of the desired type of user and servers. The result will be two candidate sets 160, one candidate set includes users on exchange servers and the other candidate set 160 includes available exchange servers.

One or both of the candidate sets 160 can be reduced by the filter component 130. The filter component 130 can, for example, remove users with accounts less than a particular size (e.g., ten Megabytes) and/or remove servers with less than a particular storage size available (e.g., ten Gigabytes). One or both of the candidate sets 160 can then be ranked by the filter component 130. For example, the filter component 130 can rank exchange user accounts in ascending order based on the size of the accounts, and, rank the servers in ascending order based on available capacity. The resource manager 110 can then be used to facilitate moving of the user accounts identified in the user account candidate set 160 to the servers identified in the server candidate set 160.

While FIG. 1 is a block diagram illustrating components for the system 100, it is to be appreciated that the system 100, the resource manager 110, the query engine 120 and/or the filter component 130 can be implemented as one or more computer components, as that term is defined herein. Thus, it is to be appreciated that computer executable components operable to implement the system 100, the resource manager 110, the query engine 120 and/or the filter component 130 can be stored on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the present invention.

Figure 2:
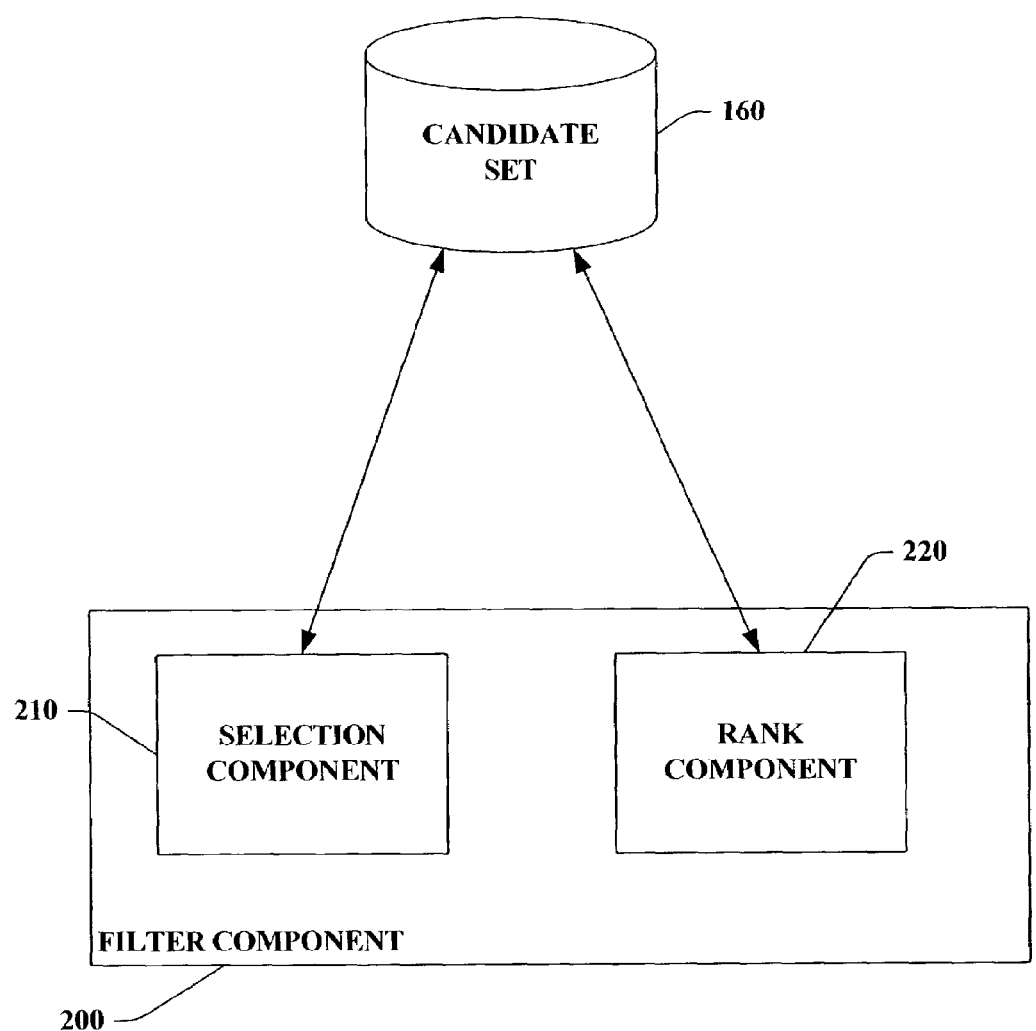
FIG. 2 is a block diagram of a filter component in accordance with an aspect of the present invention.

Next, turning to FIG. 2, a filter component 200 in accordance with an aspect of the present invention is illustrated. The filter component 200 includes a selection component 210 and/or a rank component 220. The filter component 200 communicates with a candidate set 160 of resource(s) (e.g., identified by a query engine 120 (not shown)).

The selection component 210 extracts a subset of the candidate set 160 (e.g., reduced set) based, at least in part, upon properties, characteristic(s), attribute(s) and/or relationship(s) between resource(s) and stores the extracted subset in the candidate set 160. The selection component 210 can thus reduce the size of the candidate set 160 (e.g., narrow candidate set 160).

The rank component 220 ranks the candidate set 160 (e.g., based on a ranking schema) and/or removes resource(s) from the candidate set 160 with a ranking score below a predetermined threshold (e.g., static and/or dynamic). The rank component can sort and/or order the candidate set 160 based, at least in part, upon a predefined criteria (e.g., the order actions will be performed). Ranking allows, for example, the candidate set 160 of resource(s) that can fulfill the request to be aligned in the specific order that the actions are going to be performed.

For example, the filter component 200 can be employed as part of a system for resource provisioning associated with instantiation of a new mail account. A candidate set 160 can include a constraint of active mailbox resource(s). The selection component 210 can filter the candidate set 160, for example to remove resource(s) from the candidate set 160 that are not associated a particular service plan associated with the new mail account and/or resource(s) that do not have sufficient capacity to satisfy the new mail account request. Thereafter, the rank component 220 can rank the resource(s) of the candidate set 160, for example, based upon capacity. Thereafter, the system can initiate allocation of the resource in order to instantiate the new mail account.

It is to be appreciated that the filter component 200, the selection component 210 and/or the rank component 220 can be computer components as that term is defined herein.

Figure 3:
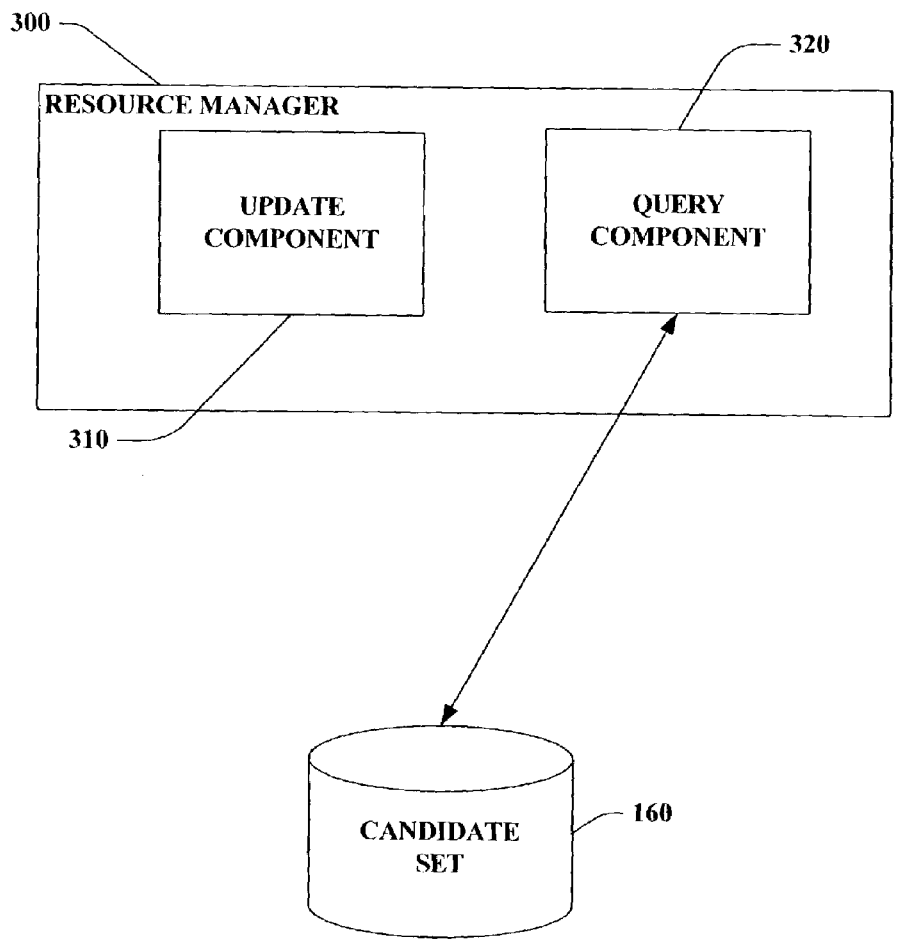
FIG. 3 is a block diagram of a resource manager in accordance with an aspect of the present invention.

Turning to FIG. 3, a resource manager 300 in accordance with an aspect of the present invention is illustrated. The resource manager 300 includes an update component 310 and/or a query component 320.

The resource manager 300 receives a resource query, for example, from a user. The resource manager 300 provides the resource query to a query engine 120 (not shown). Additionally, the resource manager 300 can be employed to facilitate operation(s) on the resource(s) defined in a filtered candidate set 160.

The update component 310 can facilitate changes to data in an underlying data store (not shown) and/or return data to a user and/or system. The update component 310 can facilitate action(s) that will be performed on the resource(s) identified in the candidate set 160. The action(s) can include, for example, allocating and de-allocating resources or returning information regarding the candidate set 160. Resource manager 300 can then provide a user (not shown) with the results of the request.

The update component 310 can, for example, allocate substantially all consumers (e.g., in a candidates' table (not shown)) to the first ranked resource in the candidate set 160.

The query component 320 provides information regarding the filtered candidate set 160, for example, to a user and/or system. For example, the query component 320 can return descriptions for substantially all the resource(s) in the candidate set 160.

It is to be appreciated that the resource manager 300, the update component 310 and/or the query component 320 can be computer components as that term is defined herein.

In view of the exemplary systems shown and described above, methodologies that may be implemented in accordance with the present invention will be better appreciated with reference to the flow charts of FIGS. 4, 5, 6 and 7. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Figure 4:
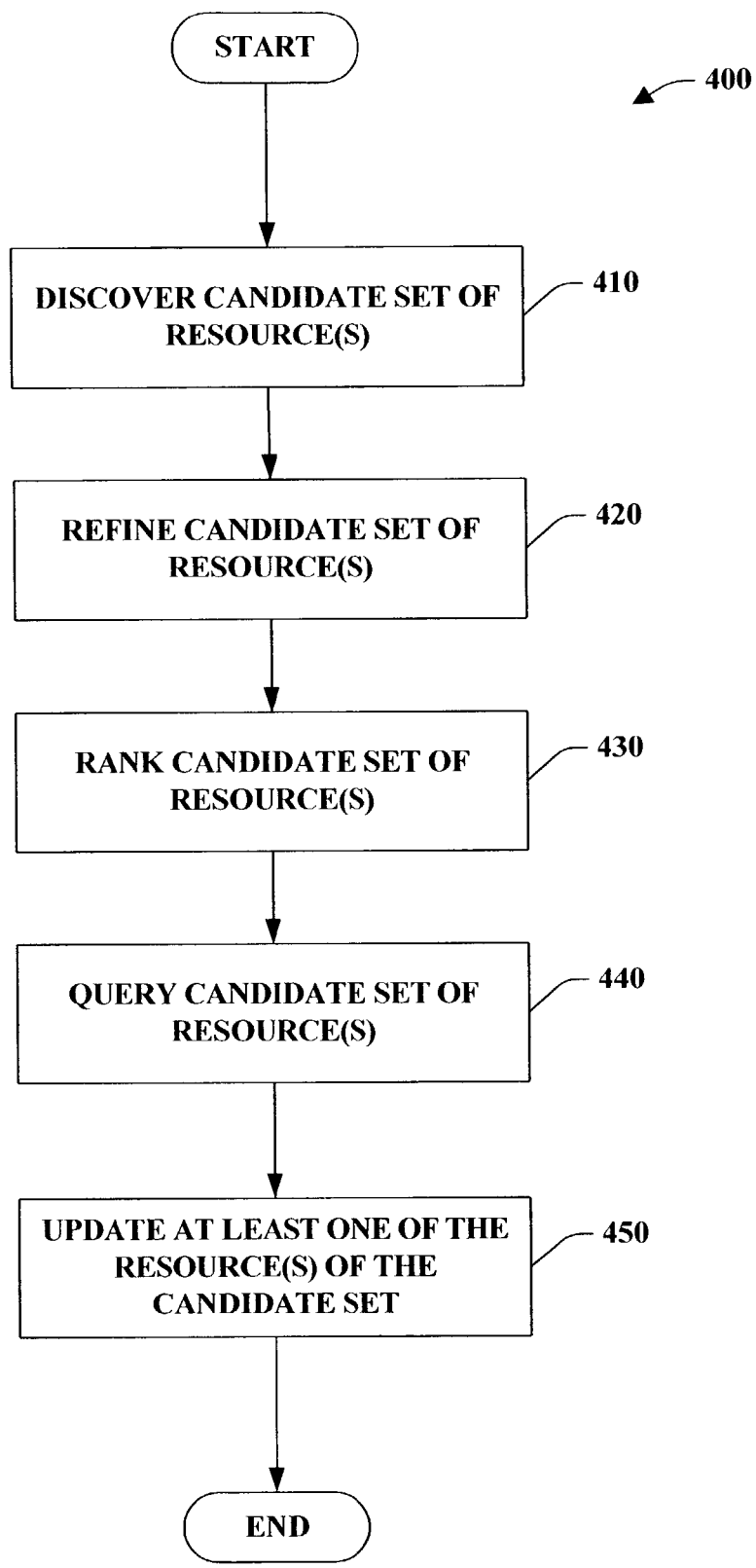
FIG. 4 is a flow chart of a method for managing queries over a resource pool in accordance with an aspect of the present invention.

Referring to FIG. 4, a method 400 for managing queries over a resource pool in accordance with an aspect of the present invention is illustrated. The resource pool can include a plurality of similar and/or disparate resource(s). At 410, a candidate set of resource(s) is discovered (e.g., by a query engine utilizing constraint(s)). Thus, the resource pool of similar and/or disparate resource(s) is searched for resource type(s) that meet constraint(s) associated with the desired resource type. Discovery can be accelerated through exploiting the power of SQL. Rather than reviewing for each resource type within the plurality of resources, SQL allows the complex searches, for example, to first eliminate the resource(s) that do not include the resource types that meet the properties and/or constraints. During discovery, the large set of similar and/or disparate resource type(s) is narrowed to resource type(s) that meet the constraint(s), and the narrow set is utilized to create the candidate set for further processing. For example, the candidate set can be based, at least in part, upon a search of attributes of a resource pool that comprises a plurality of resources.

At 420, the candidate set of resource(s) is refined (e.g., by a filter component). For example, selection criteria can be applied to the candidate set in order to further eliminate resource(s) that do not meet requirement(s) to complete the request and/or retain resource(s) that meet the requirement(s) to complete the request. Further, in one example, more than one reducing scheme can be applied sequentially or concurrently.

Next, at 430, the candidate set of resource(s) is ranked (e.g., by a filter component). The resource(s) can be ranked, for example, on one or more criteria (e.g., physical size, physical location of resource, etc.). At 440, the candidate set of resource(s) is queried (e.g., for descriptions of substantially all resource(s) of the candidate set). At 450, at least one of the resource(s) of the candidate set is updated. If an action has been requested, it can be performed. For example, actions can include allocating and/or de-allocating as well as returning information regarding the candidate set to the requestor.

Figure 5:
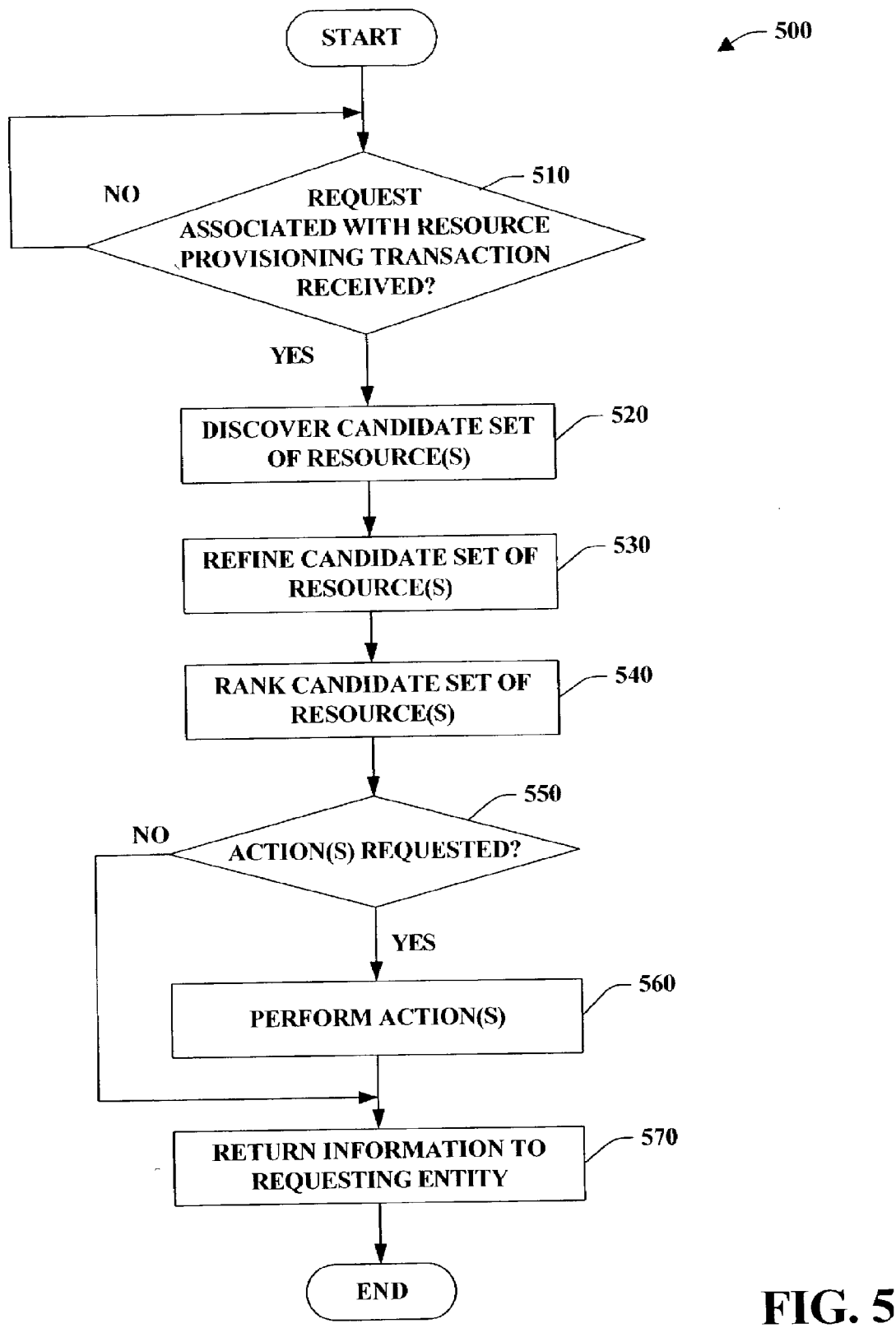
FIG. 5 is a flow chart of a method for managing queries over a resource pool in accordance with an aspect of the present invention.

Turning to FIG. 5, a method 500 for managing queries over a resource pool in accordance with an aspect of the present invention is illustrated. At 510, a determination is made as to whether a request associated with a resource provisioning transaction has been received. If the determination at 510 is NO, processing continues at 510.

If the determination at 510 is YES, at 520, a candidate set of resource(s) is discovered (e.g., by a query engine utilizing constraint(s)). A resource pool of similar and/or disparate resource(s) is searched for resource type(s) that meet constraint(s) associated with the desired resource type (e.g., via SQL). The set of similar and/or disparate resource type(s) is thus narrowed to resource types that meet the constraint(s), and the narrow set is utilized to create the candidate set for further processing. The candidate set is a subset of and therefore typically smaller than the resource pool unless the resource pool contains only the resource type(s) being located.

At 530, the candidate set of resource(s) is refined (e.g., by a filter component). Selection criteria can be applied to the candidate set in order to refine the candidate set. At 540, the candidate set of resource(s) is ranked (e.g., by a filter component).

At 550, a determination is made as to whether action(s) have been requested. If the determination is YES, at 560, the action(s) are performed and processing continues at 570. If the determination at 550 is NO, at 570, information is returned to the requesting entity.

Figure 6:
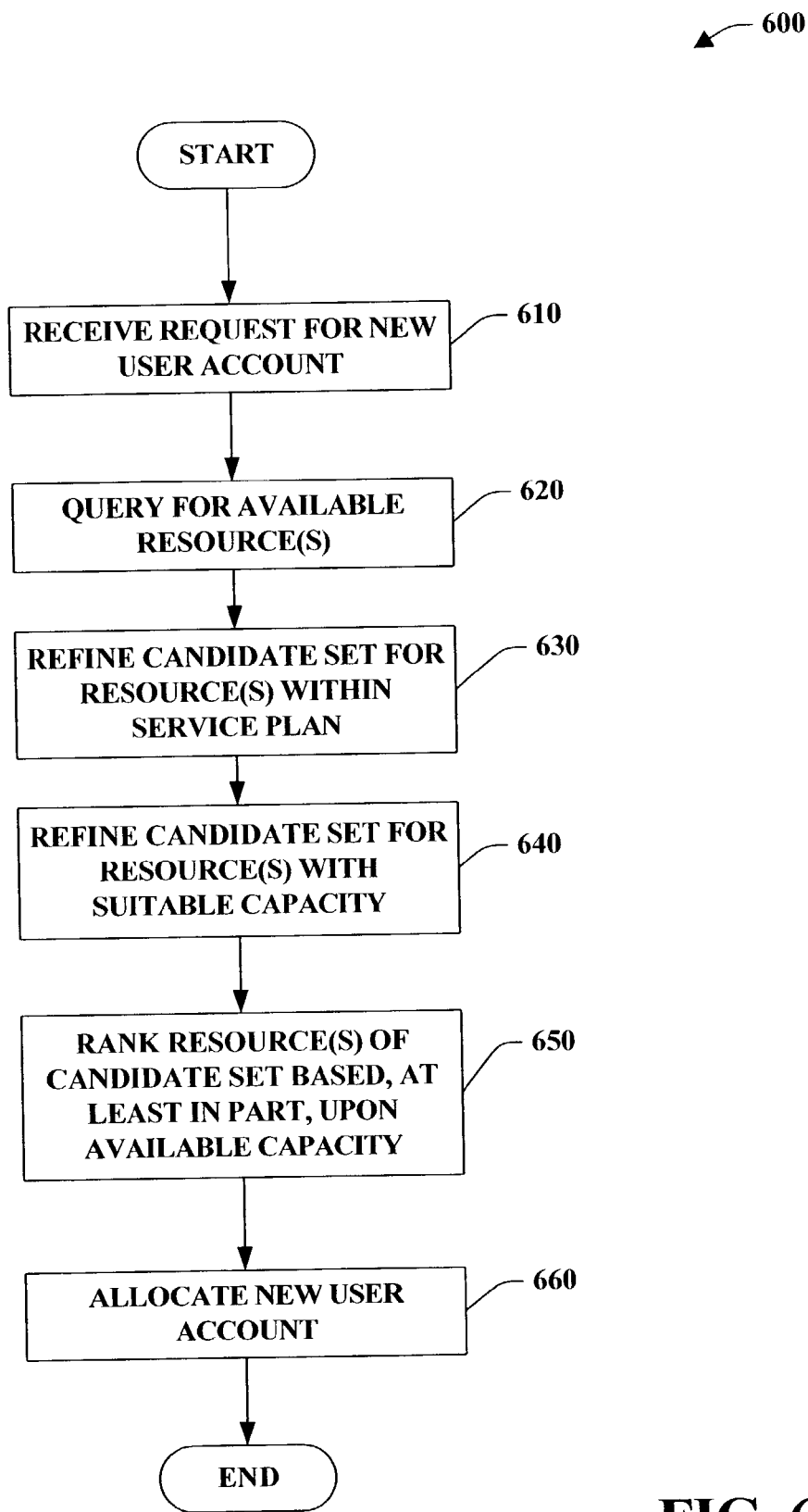
FIG. 6 is a flow chart of a method for allocating a new user account in accordance with an aspect of the invention.

Next, referring to FIG. 6, a method 600 for allocating a new user account in accordance with an aspect of the invention is illustrated. At 610, a request for a new user account is received. At 620, available resource(s) are queried. The query can be for available resource type(s), from a pool of disparate resource(s), that are associated with a user accounts to produce a candidate set of resource(s).

At 630, the candidate set is refined for resource(s) within the service plan. At 640, the candidate set is refined for resource(s) with suitable capacity. Thus, the remaining resources are of a type for a new user account, that fall within the user service plan and have sufficient capacity to establish the new user account.

At 650, the resource(s) of the candidate set are ranked based, at least in part, upon available capacity. Thus, the new user account can be allocated, for example, to a resource having the greatest capacity for new account(s). At 660, the new user account is allocated.

Figure 7:
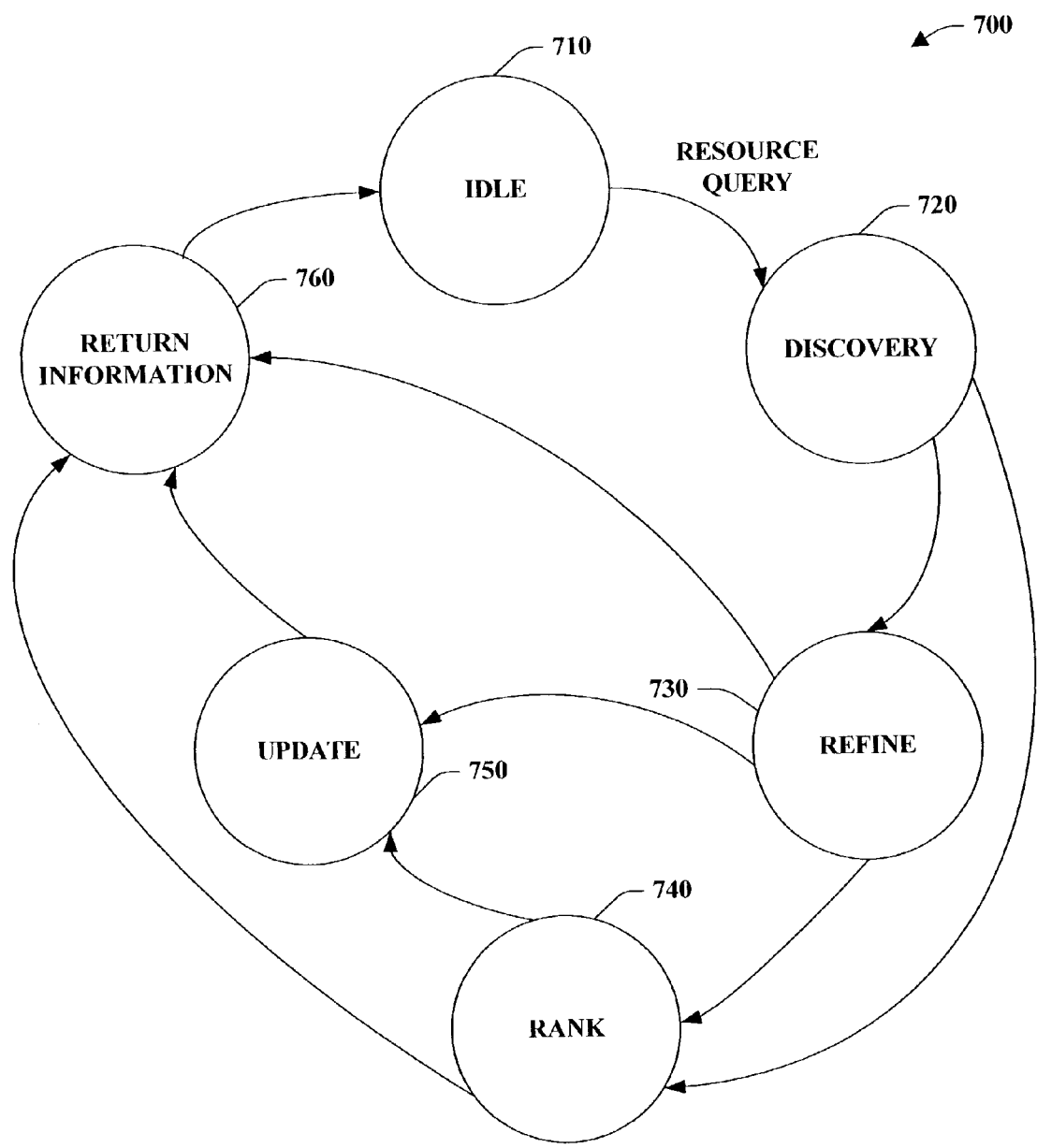
FIG. 7 is a state diagram of a query management system in accordance with an aspect of the present invention.

Turning to FIG. 7, a state diagram 700 of a query management system in accordance with an aspect of the present invention is illustrated. A resource query (e.g., resource provisioning transaction) initiates a transition from an idle state 710 to a discovery state 720. In the discovery state, 720 a resource pool is queried in order to identify a candidate set of resource(s) that fulfill the resource query. For example, the resource query can be related to a user setting up an online mail account.

Once the candidate set of resource(s) has been identified, the candidate set can be refined in a refine state 730 and/or ranked in a rank state 740. After the refine state 730 and/or the rank state 740, if the resource query relates to action(s), in an update state 750, action(s) can be taken with regard to the resource(s). If the resource query does not relate to action(s), a return information state 760 is entered. The return information state 760 can also be entered after the update state 750. Information associated with the resource query is returned in the return information state 760.

Figure 8:
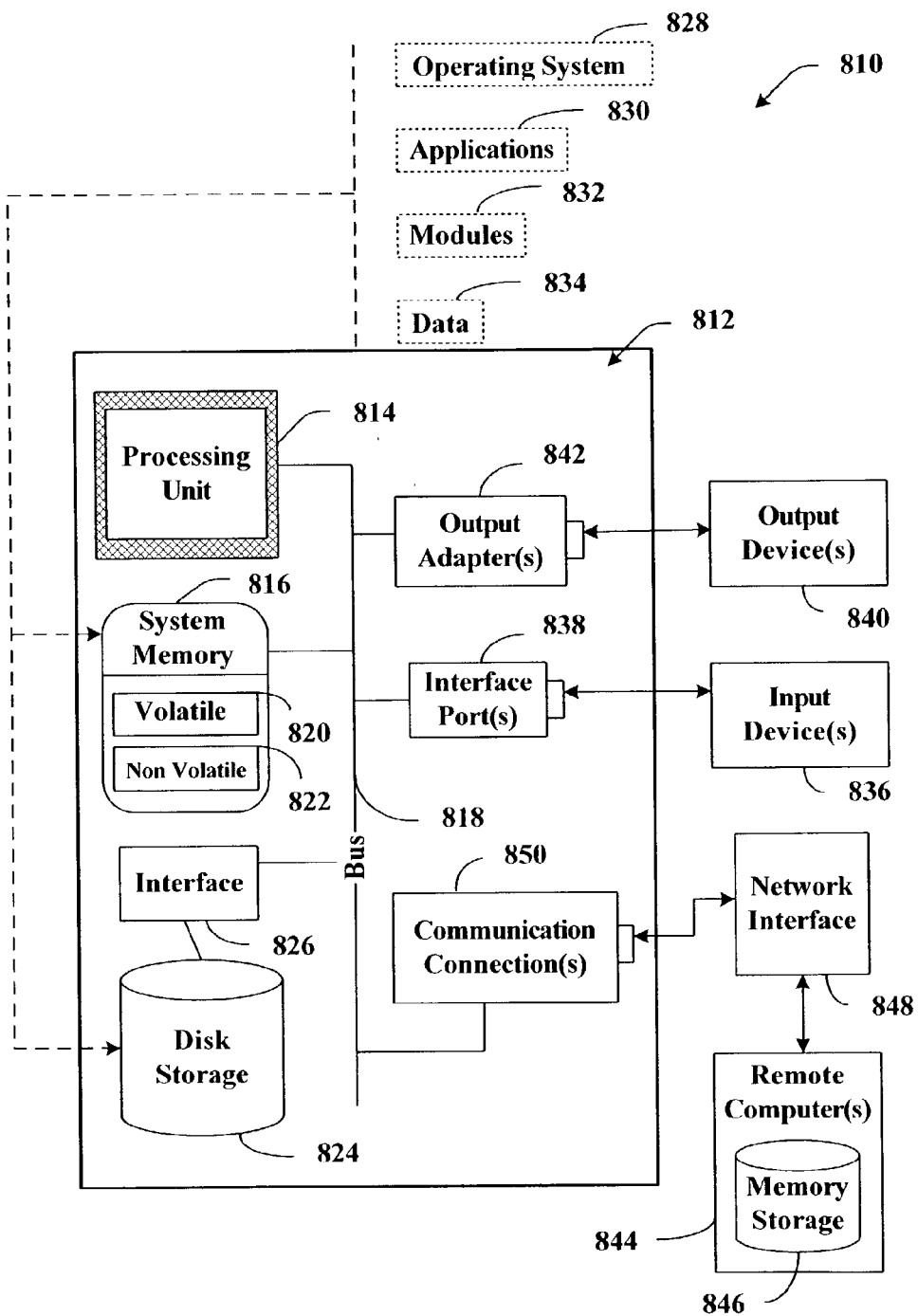
FIG. 8 illustrates an example operating environment in which the present invention may function.

In order to provide additional context for various aspects of the present invention, FIG. 8 and the following discussion are intended to provide a brief, general description of a suitable operating environment 810 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software. Generally, however, program modules include routines, programs, objects, components, data structures, etc. that perform particular tasks or implement particular data types. The operating environment 810 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multi-processor systems, microprocessor-based systems, programmable consumer electronics, network PCs, minicomputers, mainframe computers, distributed computing environments that include the above systems or devices, and the like.

With reference to FIG. 8, an exemplary environment 810 for implementing various aspects of the invention includes a computer 812. The computer 812 includes a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 816 includes volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable ROM (EEPROM), or flash memory. Volatile memory 820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 812 also includes removable/nonremovable, volatile/nonvolatile computer storage media. FIG. 8 illustrates, for example a disk storage 824. Disk storage 824 includes, but is not limited to, devices like a magnetic disk drive, floppy disk drive, tape drive, Jaz drive, Zip drive, LS-100 drive, flash memory card, or memory stick. In addition, disk storage 824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 824 to the system bus 818, a removable or non-removable interface is typically used such as interface 826.

It is to be appreciated that FIG. 8 describes software that acts as an intermediary between users and the basic computer resources described in suitable operating environment 810. Such software includes an operating system 828. Operating system 828, which can be stored on disk storage 824, acts to control and allocate resources of the computer system 812. System applications 830 take advantage of the management of resources by operating system 828 through program modules 832 and program data 834 stored either in system memory 816 or on disk storage 824. It is to be appreciated that the present invention can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port may be used to provide input to computer 812, and to output information from computer 812 to an output device 840. Output adapter 842 is provided to illustrate that there are some output devices 840 like monitors, speakers, and printers among other output devices 840 that require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844.

Remote computer(s) 844 is logically connected to computer 812 through a network interface 848 and then physically connected via communication connection 850. Network interface 848 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the bus 818. While communication connection 850 is shown for illustrative clarity inside computer 812, it can also be external to computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A query management system for managing queries over a resource pool, comprising:
   a processing unit that executes one or more computer-executable components stored on a computer storage medium, the components comprising:
   a resource manager that identifies respective servers associated with a set of user accounts and receives a query of resources relating to a resource provisioning transaction comprising allocation of resources on one or more of the respective servers for a new user account, wherein the resources comprise one or more of available disk storage, available network bandwidth, and available software license(s);
   a query engine that identifies a candidate set of resources corresponding to the query of resources at least in part by querying a set of resources associated with a resource pool corresponding to the identified respective servers associated with the set of user accounts, wherein the query performed over the set of resources is based, at least in part, upon at least one constraint associated with the resource query, the at least one constraint corresponding to servers that are online, are available for allocation, are part of a user service plan, and have capacity for a new user account; and
   a filter component that filters the candidate set to organize the candidate set and reduce the size of the candidate set by ranking, the filtered candidate set according to a score, and removing resources with a ranking score below a predetermined threshold from the filtered candidate set, and ordering the remaining filtered candidate set based upon the score;

wherein the resource manager provides identities of resources in the filtered candidate set suitable for allocation of a new user account in response to the query of resources.

2. The system of claim 1, the filter component further comprising a selection component that reduces a quantity of resources of the candidate set based, at least in part, upon one or more of a property, a characteristic, an attribute and a relationship between resources.

3. The system of claim 1, the filter component further comprising a rank component that performs the ranking of the filtered candidate set according to the score.

4. The system of claim 1 further comprising a resource constraint(s) store that stores the at least one constraint.

5. The system of claim 1, the resource pool comprising a plurality of disparate resources.

6. The system of claim 1, wherein the resource manager further performs at least one action on at least one resource of the filtered candidate set.

7. The system of claim 1, wherein the query engine employs an SQL environment.

8. A query management system comprising:
    a processing unit that executes one or more computer-executable components stored on a computer storage medium, the components comprising:
    a resource manager that maps respective user accounts to servers at which the user accounts reside and receives a query of resources associated with moving a user account from a server on which the user account resides to a disparate server, the resources comprising one or more of available disk storage, available network bandwidth, and available software license(s);
    a query engine that employs an SQL environment to perform a query concurrently over a resource pool that comprises a plurality of resources at the servers at which the respective user accounts reside based, at least in part, upon at least one constraint associated with the query, wherein the at least one constraint corresponds to servers that are online, are available for allocation, are part of a user service plan, and have capacity for a new user account, and the query engine identifies a candidate set of resources based on the resource pool attribute search; and
    a filter component that organizes and filters the candidate set, the filter component comprising a selection component and a rank component that ranks the filtered candidate set according to a score, and organizes the resources according to the score, and removes resources from the filtered candidate set based on a the ranking score being below a predetermined threshold, the resource manager providing identities of candidate resources corresponding to the user account in the filtered candidate set in response to the query; and
    an update component that facilitates performance of one or more actions on the filtered candidate set, the one or more actions comprise at least one of allocating a resource in the filtered candidate set and de-allocating a resource in the filtered candidate set.

9. The system of claim 8, the selection component reducing a quantity of resources of the candidate set based, at least in part, upon one or more of a property, a characteristic, an attribute and a relationship between resources.

10. The system of claim 8, the rank component ranking the filtered candidate set according to the score.

11. A method for managing a query over a resource pool, comprising:
    mapping one or more user accounts to respective disk storage devices associated with respective computer systems on which the user accounts reside;
    searching the computer systems and associated disk storage devices mapped to respective user accounts to locate the respective user accounts;
    identifying a candidate set of available resources for use in a resource provisioning transaction that comprises moving a set of user accounts from computer systems on which the user accounts reside to respective disparate computer systems based, at least in part, upon a resource query performed at least over a set of resources, wherein the candidate set of resources comprises one or more of disk storage, network bandwidth, and software license(s) and the resource query has one or more constraints associated therewith, the constraints comprising computer systems that are online, are available for allocation, are part of a user service plan, and have capacity for one or more new user accounts;
    refining the candidate set of resources using a filter component, resulting in a smaller candidate set of resources;
    ranking the refined candidate set of resources using the filter component to compile a scored set for the refined candidate set, and organizing the scored set using the filter component;
    removing resources from the refined and organized candidate set of resources that have a ranking score below a predetermined threshold; and
    returning information associated with the candidate set of resources in response to the resource query.

12. The method of claim 11, further comprising at least one of the following acts:
    receiving the query of resources;
    querying at least one of the resources of the candidate set; and
    updating at least one of the resources of the candidate set.

13. A query management system for managing queries over a resource pool, comprising:
    a processing unit that executes one or more computer-executable components stored on a computer storage medium, the components comprising:
    a resource manager component that locates a set of user accounts at least in part by mapping the user accounts to respective servers at which the user accounts reside and searching the servers for the respectively mapped user accounts and receives a query of available resources for moving at least one user account from a server at which the user account resides to a new server, the resources comprising at least one of disk storage, network bandwidth, and software license(s);
    a query engine component that employs an SQL environment to perform the resource query over a set of resources and identifies a candidate set of resources for moving the at least one user account from a resource pool corresponding to a plurality of servers based, at least in part, upon at least one constraint associated with the resource query, the at least one constraint corresponding to servers that are online, are available for allocation, are part of a user service plan, and have capacity for a new user account; and
    a filter component that filters the candidate set of resources to result in a smaller candidate set of resources, ranks the filtered candidate set by using the filter component to compile a scored set and organizing the scored set using the filter component, and removes resources from the filtered and organized candidate set with a ranking score below a predetermined threshold, wherein the resource manager component provides identities of respective resources in the filtered candidate set that are suitable for use in moving the at least one user account in response to the resource query.

14. A query management system for managing queries over a resource pool, comprising:

a processing unit that executes one or more computer-executable instructions stored on a computer storage medium, the processing unit configured to:

means for identifying respective servers at which one or more user accounts reside;

means for receiving a resource query related to a resource provisioning transaction comprising allocation of resources on one or more of the respective servers for a new user account, wherein the resources comprise one or more of available disk storage, available network bandwidth, and an available software license;

means for employing an SQL environment to perform a query over a set of resources and identifying a candidate set of resources based, at least in part, upon at least one constraint associated with the resource query, the at least one constraint corresponding to servers that are online, are available for allocation, are part of a user service plan, and have capacity for a new user account;

means for filtering the candidate set of resources using a filter component, resulting in a smaller candidate set of resources;

means for ranking the filtered candidate set of resources using the filter component to compile a scored set for the refined candidate set, and organizing the scored set using the filter component;

means for removing resources from the filtered and organized candidate set of resources with a ranking score below a predetermined threshold; and means for allocating resources from the filtered candidate set of resources for the new user account.

15. The system of claim 6, wherein the at least one action performed on at least one resource of the filtered candidate is one or more of allocating a resource in the filtered candidate set and de-allocating a resource in the filtered candidate set.

16. The system of claim 1, wherein the query of resources relates to resource provisioning transaction comprises moving information from a first resource in the resource pool to a second resource in the resource pool.

17. The system of claim 1, wherein the resource provisioning transaction comprises moving a set of user accounts from a first set of servers to a second set of servers and the resources further comprise the set of user accounts.

18. The system of claim 16, wherein the first resource is disk storage at a first server and the second resource is disk storage at a second server.

* * * * *